A. E. EBERT.
CIGAR-BOX.
No. 191,038. Patented May 22, 1877.
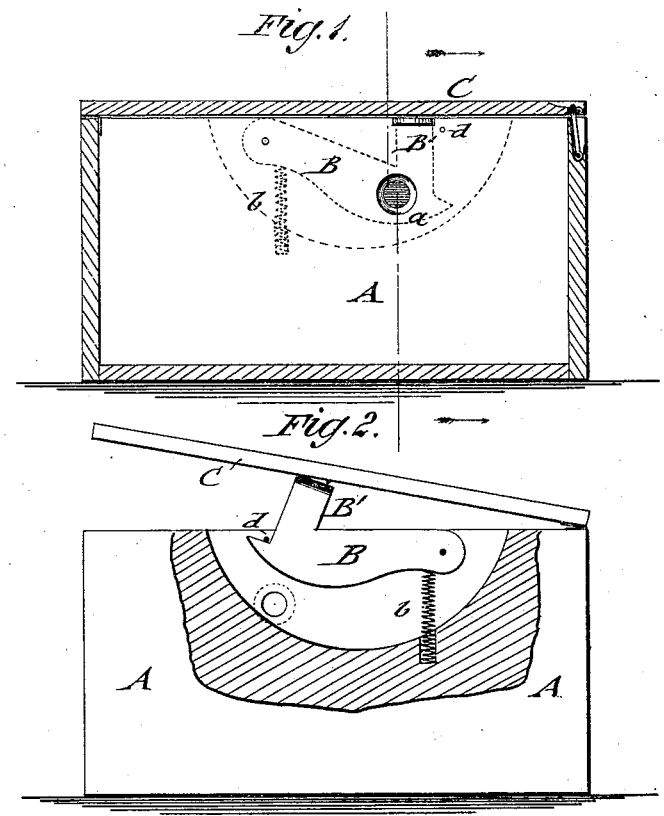
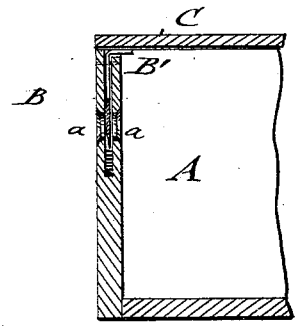
WITNESSES:
INVENTOR:
BY
ATTORNEYS.

UNITED STATES PATENT OFFICE.

ALEXANDER E. EBERT, OF KNOXVILLE, TENNESSEE.

IMPROVEMENT IN CIGAR-BOXES.

Specification forming part of Letters Patent No. 191,038, dated May 22, 1877; application filed April 2, 1877.

*To all whom it may concern:*

Be it known that I, ALEXANDER E. EBERT, of Knoxville, in the county of Knox and State of Tennessee, have invented a new and Improved Cigar-Box, of which the following is a specification:

In the accompanying drawing, Figure 1 represents a vertical transverse section of my improved cigar-box; Fig. 2, an end view of the same, with part cut off, and Fig. 3 a vertical transverse section of the cutting device.

Similar letters of reference indicate corresponding parts.

This invention relates to an improved cigar-box, by which the ends of the cigars may be cut off by a neat and convenient attachment; and the invention consists of a cigar-box having one of its sides perforated for inserting the ends of the cigars, in connection with a suitable cutting-knife operated by the lid.

In the drawing, A represents a cigar-box, which is provided at the front or sides with a perforation, *a*, of sufficient size to admit the insertion of the ends of the cigars packed in the box.

The wall of the box above the perforation *a* is recessed by a circular saw, or otherwise, as shown in Fig. 2, and a cutting-knife, B, pivoted into the recess to cut off the point or tip of the cigar when depressing the lid C.

The cutting-knife B is acted upon by a spiral or other spring, *b*, and retained in the recess by a stop-pin, *d*, at its front end, as shown in Fig. 2, the knife extending by a handle, B', with bent top part over the top edge of the wall, to be acted upon at will either by the lid or the hand. The cutting-knife may also be attached rigidly to the lid, in which case the point of the cigar can be only cut off by the action of the lid.

The lid C is closed by a wire loop of the front side locking over a stop-pin or staple of the lid, or by any other suitable device, the lid being raised by the spring-acted knife as soon as the fastening is released.

The cutting attachment forms a cheap and convenient improvement to cigar-boxes, as the cigars may be cut at the same time when they are taken from the box for being smoked.

Having thus described my invention, I claim as new and desire to secure by Letters Patent—

1. The combination of a cigar-box, having a perforation in one of its sides for the insertion of the ends of the cigars, with a cutting-knife, B, operated by the cover, substantially as specified.

2. The combination of a cigar-box, having perforation and knife-guiding recess, and operated by the hand or cover, with a pivoted and spring-acted cigar-cutting knife, retained by a stop-pin in the recess, substantially in the manner set forth.

3. The pivoted and spring-acted cutting-knife B, arranged in a cigar-box, and having extension, with bent top or shoulder for depressing knife by finger or lid, substantially as described.

ALEXANDER EUGEN EBERT.

Witnesses:
S. W. PAXTON,
M. D. SULLIVAN.